US005178025A

United States Patent [19]

Bennett et al.

[11] Patent Number: 5,178,025

[45] Date of Patent: Jan. 12, 1993

[54] TILTABLE LIFT SEAT DEVICES

[75] Inventors: John E. Bennett, Rancho Palos Verdes; Leonard Katzin, Beverly Hills, both of Calif.

[73] Assignee: Innovative Medical Engineering, Inc., Hawthorne, Calif.

[21] Appl. No.: 576,353

[22] Filed: Aug. 31, 1990

[51] Int. Cl.[5] ........................ F16H 21/44; A47C 3/00

[52] U.S. Cl. ...................................... 74/105; 248/561; 248/575; 297/339; 297/DIG. 10

[58] Field of Search ........................ 74/99 R, 110, 105; 297/339, DIG. 10; 16/66, 70; 248/561, 575

[56] References Cited

U.S. PATENT DOCUMENTS

| | | | |
|---|---|---|---|
| 695,987 | 3/1902 | Winslow | 16/66 X |
| 1,197,818 | 9/1916 | Grisell | 16/70 |
| 1,952,070 | 3/1934 | Hruska | 16/65 XR |
| 2,547,089 | 4/1951 | Oberst | 16/66 |
| 4,309,057 | 1/1982 | Lindley | 297/58 |
| 4,454,781 | 6/1984 | Orii | 74/99 R |
| 4,581,778 | 4/1986 | Pontoppidan | 297/DIG. 10 XR |
| 4,632,455 | 12/1986 | Schiller et al. | 297/326 |
| 4,690,457 | 9/1987 | Poncy et al. | 297/337 |
| 4,752,100 | 6/1988 | Lemaire | 297/84 |
| 4,786,107 | 11/1988 | Crockett | 297/330 |

FOREIGN PATENT DOCUMENTS

| | | | |
|---|---|---|---|
| 0077280 | 9/1982 | European Pat. Off. . | |
| 600834 | 10/1975 | Switzerland . | |
| 1041334 | 9/1983 | U.S.S.R. | 297/339 |
| 122 | 1/1910 | United Kingdom | 16/70 |

*Primary Examiner*—Allan D. Herrmann
*Attorney, Agent, or Firm*—Merchant, Gould, Smith, Edell, Welter & Schmidt

[57] ABSTRACT

A seating device for aged, infirm and handicapped persons includes a passive, pivotably mounted, energy storage device laterally disposed below a seat base, and a parallelogram linkage between the seat base and a chair seat for controlling elevation and tilting motion of the seat. A lever which can be coupled at selectable points along an arc about the pivot point of the energy storage device exerts torque on the parallelogram linkage to oppose downward movement and aid upward movement. By varying the position of engagement of the energy storage device to the lever, the force exerted can be adjusted to the weight of the user.

26 Claims, 11 Drawing Sheets

TILTABLE LIFT SEAT DEVICES

BACKGROUND OF THE INVENTION

This invention relates to seating units, and more particularly to seating units in which the seat rises to aid a handicapped or infirm person in both sitting and rising.

Persons who are weak or debilitated, such as the aged, infirm, handicapped and rehabilitating, have some difficulty in reaching a sitting posture in a chair, and substantially greater difficulty in rising from the chair. Consequently, many different systems have been proposed to aid such persons, including power driven mechanisms which raise the entire upper body of an upholstered chair in a lifting and tilting motion. Power driven systems, however, whether electrically, hydraulically or pneumatically driven, are subject to power failure, and tend to be heavy and expensive. In recognition of this or other factors, a number of other configurations for elevating a seat have also been devised. A number are based upon the use of a linkage or parallelogram structure between a seat base and the seat cushion, with the arms of the linkage being of different lengths and therefore tilting the seat as it rises. These arrangements usually employ a power drive extending angularly up from the base. Some mechanisms utilize energy storage devices, such as mechanical springs or gas springs to store mechanical energy. Thus the energy made available when the body weight lowers the seat can be stored and returned to aid in lifting. However, these mechanisms are typically not readily adjustable so as to accommodate persons of different weights, and also tend to be bulky and mechanically complex.

No seat elevator and lowering devices are presently known which provide a suitable combination of low cost, ease of adjustment for different body weights, compactness, energy storage, and capability for use in a variety of modes. It is desirable, for example, to be able to utilize the seat lifting capability in different types of chairs, such as folding and non-folding chairs, to have a unit which is light enough to be portable. Preferably, the unit should be passive and not require an independent source of power. Further, a seat elevating mechanism that is a self-contained unit that can be placed on other surfaces as required can be very useful.

SUMMARY OF THE INVENTION

A mechanism for elevating a seat, in accordance with the invention, incorporates a planar seat base, typically disposed horizontally, and a lever mechanism having a pivotal coupling under the seat base, with a first arm having a number of engagement regions spaced along an arc. A gas spring, mounted parallel to the plane of the seat base on the same side as the lever, is pivoted about a pivot point spaced apart from the lever arm, so that an extensible member on the base spring moves radially in and out relative to a selected one of the engagement points on the lever. A second arm of the lever extends in a different direction from the pivot point on the lever, which pivots in a plane parallel to the seat base. The second arm is engaged at or near its free end to a linkage mechanism that extends upwardly through the seat base to engage a fixed member on a parallelogram linkage coupling the seat base to a seat above, each element of the parallel linkage being pivotally coupled at each end to provide a controlled and variable (adjustable) amount of lifting and tilting motion. The linkage mechanism includes at least two pivot arms that convert the motion in the horizontal plane of the attached arm of the lever into a torque for aiding upward lifting of the user when rising, and easing lowering of the user and seat in the action of sitting down. The last element of the linkage is configured as a ratchet and pawl mechanism which locks the intermediate linkage to the cross member on the parallelogram structure. This provides a severable mechanical connection between the parallelogram structure and the gas spring. A handle on the side of the seat enables the pawl to be disengaged from the ratchet, enabling the cross member to rotate freely and allowing the intermediate linkage to be collapsed, so that the chair seat can be stored or kept in the down position without residual forces.

Since this arrangement is disposed entirely adjacent to the seat base on the underside, and in the structure that is collapsible that lies between the seat base and the chair seat, it forms an essentially self-contained unit that need not be attached to a chair. Instead, with a protective surface covering the underside mechanism, it forms a relatively lightweight unit that can be placed on any surface where it is desired to aid the user.

In most instances, the passively-powered seat elevating and tilting mechanism will be incorporated as a part of a chair or wheelchair. The chair may be of the folding or non-folding type. For a wheelchair, the seat base structure may be mounted so as to fold along one side, so that it can be collapsed with the remainder of the wheelchair, if this is desired, or easily removed as a separate seat.

A folding chair system in accordance with the invention is particularly advantageously arranged because of the number of different modes of operation which it affords. The folding chair has front and back leg structures arranged in conventional scissor fashion, with the front legs extending to an integral back portion. The legs may incorporate telescoping sections so the chair can be adjusted in height. An arm structure is pivotally coupled to the front leg unit, and includes an extension into a rearward transverse bar so arranged that the arms have two stable positions of operation. With the user in the chair, the arms are horizontal and the transverse extension rests against the back of the seat. In the second position of operation, the arms are rotated upwardly to a position near the back of the chair, and may include curved portions for use as handles in moving the chair, while the transverse bar engages a latch at the back of the seat base to aid in pushing and levering the chair. Wheels may be incorporated along the front legs, in which event they may include wheel covers so disposed at the front edge as to limit forward tilting motion of the chair. Advantageously, the chair also includes back wheels, and these may also be mounted separately from the back legs on a pivotable mechanism that is engaged by the transverse member on the arm structure and lowers the wheels so that they support the weight of the chair and user and the unit may be rolled along on four wheels.

The elevating and tilting seat combination can also be arranged in a dual configuration so that the mechanical range can be doubled, with the seat remaining level if desired. Alternatively, an increased tilt function can be provided by allowing a part of the parallelogram structure to slide and coupling the parallelogram links together.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

The uniquely versatile seating, lifting and transporting device in accordance with the invention is illustrated in FIGS. 1–12, to which reference may now be made. This example not only depicts a passively powered lift and tilt seat, but an economical and compact folding chair arrangement by which the user may be safely and conveniently rolled from one position to another.

Figure 1:
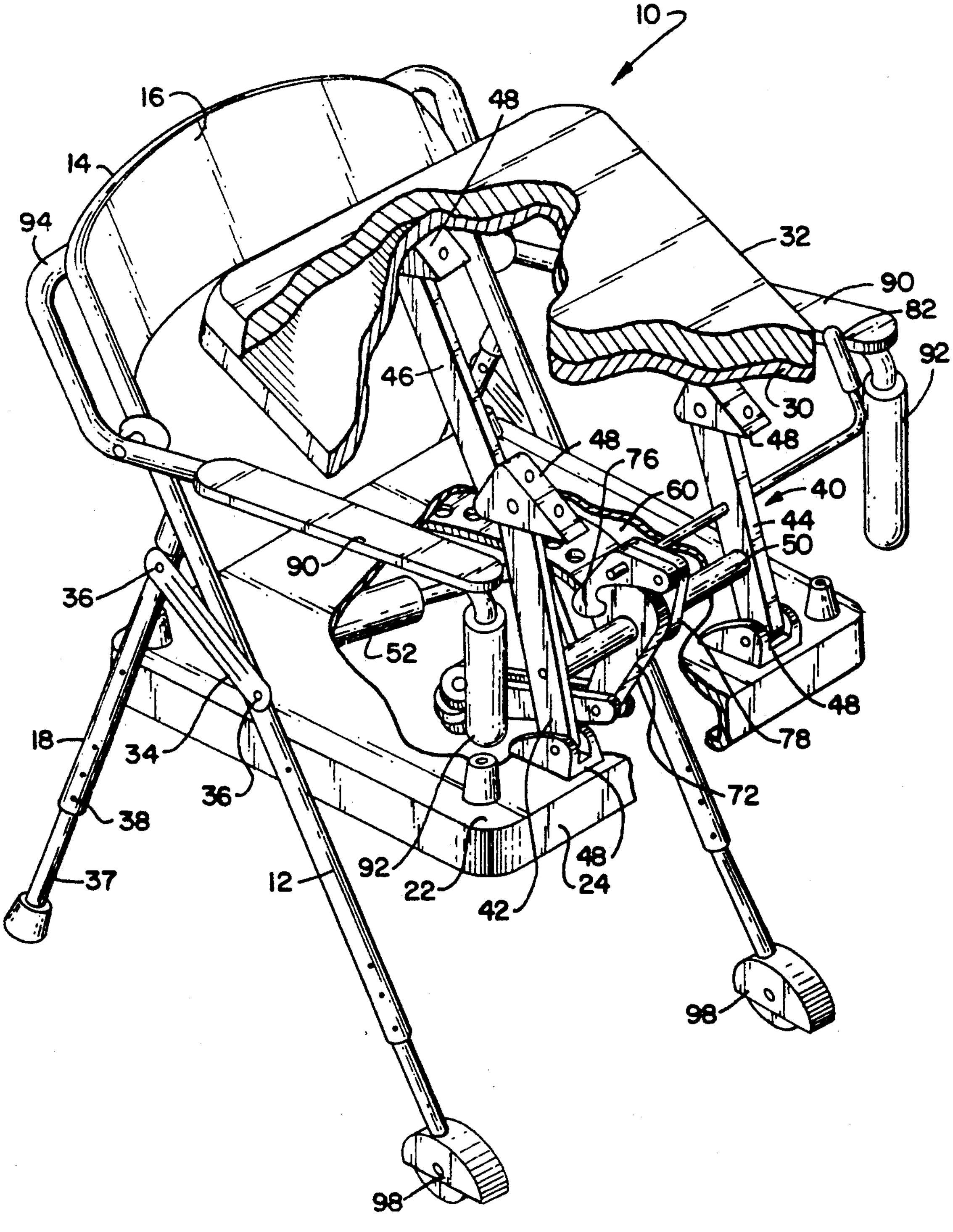
FIG. 1 is a perspective view of a folding, front-wheeled seating device in accordance with the invention incorporating a pivotable arm structure.
Figure 2:
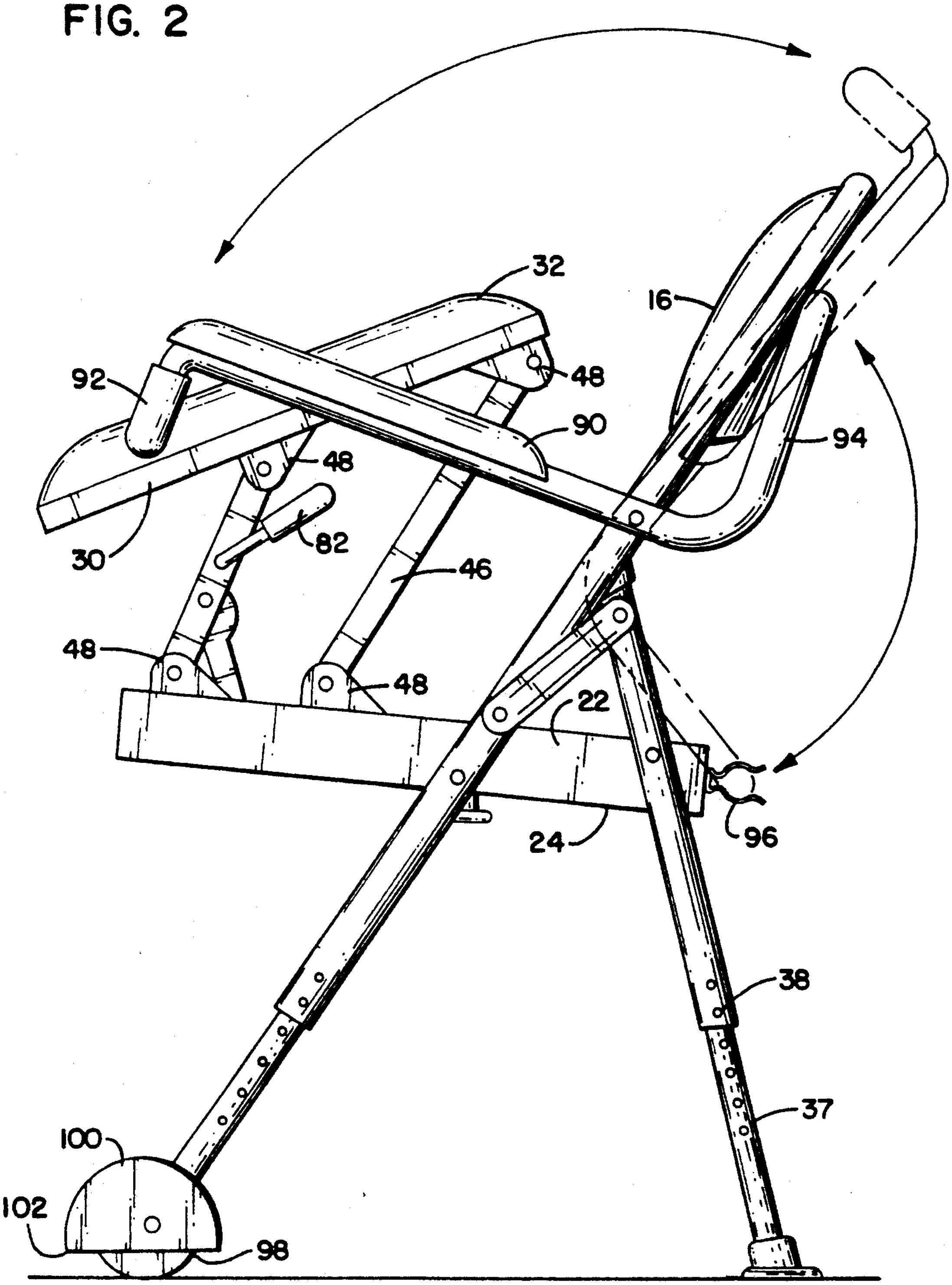
FIG. 2 is a side view of the seating device of FIG. 1, showing the side arms in a back position in phantom.
Figure 3:
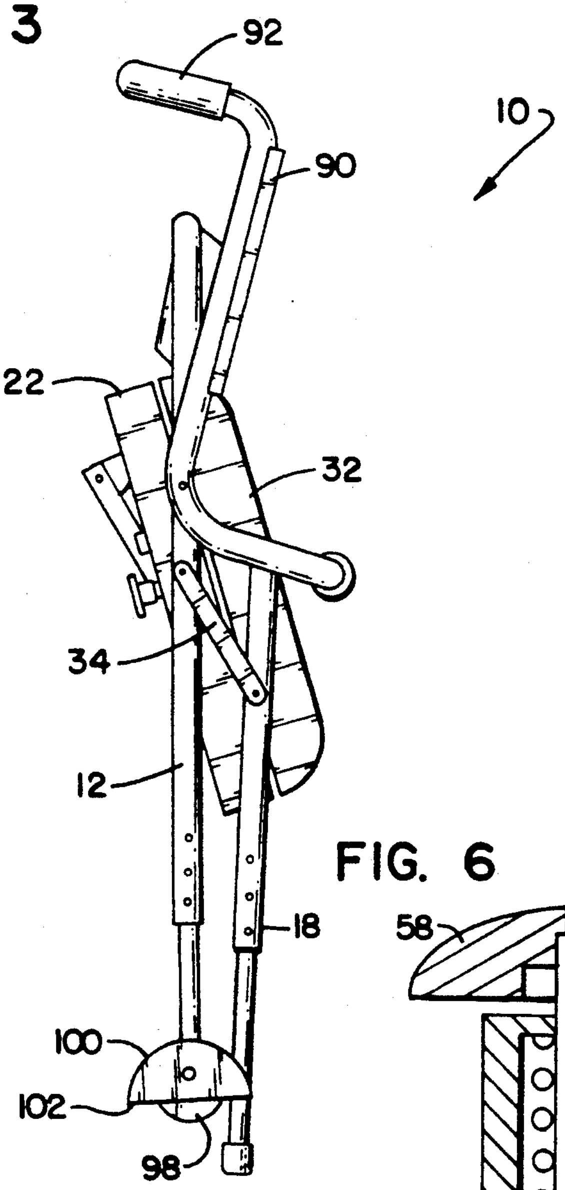
FIG. 3 is a side view of the seating device of FIGS. 1 and 2, showing the chair in folded position.

The chair 10 has front legs 12 extending upwardly into an upper frame 14 integral with the legs, and supporting a back 16. Back legs 18 joined by a crossbar 20 are coupled along with the front legs 12 to a seat base 22, which is principally a planar body having a peripheral sidewall 24 and an opening 26 therethrough for a linkage mechanism as described below. In its usual operating position, the seat base 22 is horizontal, or angled slightly to support a seat 30 having a cushion 32 on its upper side. The front and back legs 12, 18 respectively are coupled together by fold links 34 on each side, the fold links 34 being angled in conventional fashion relative to the legs so that pivots 36 coupling the fold links 34 to the legs 12, 18 and the legs 12, 18 to the base 22 permit the legs to be brought into approximate parallelism at the same time the plane of the seat base 22 and the adjacent seat 30 are similarly angled, to provide a flattened compact unit for storage or handling, as seen in FIG. 3.

The elevating and tilting action of the seat 30 relative to the base 22 is controlled by a parallelogram linkage 40 (seen best in FIGS. 1, 4, 5 and 7), here comprising a pair of relatively shorter front links 42, 44 and a relatively longer back link 46. The links 42, 44 and 46 are coupled at their opposite ends to the upper surface of the seat base 22 and the lower surface of the seat 30 respectively by individual pivotal couplings 48. Four or more links may be utilized instead of three, and it is understood that the relative lengths of the links and their dispositions may be changed so as to vary the nature of the elevating and tilting motion. The front links are coupled together by a lateral torque bar 50, fixedly mounted horizontally in between the front links 42, 44.

Figure 6:
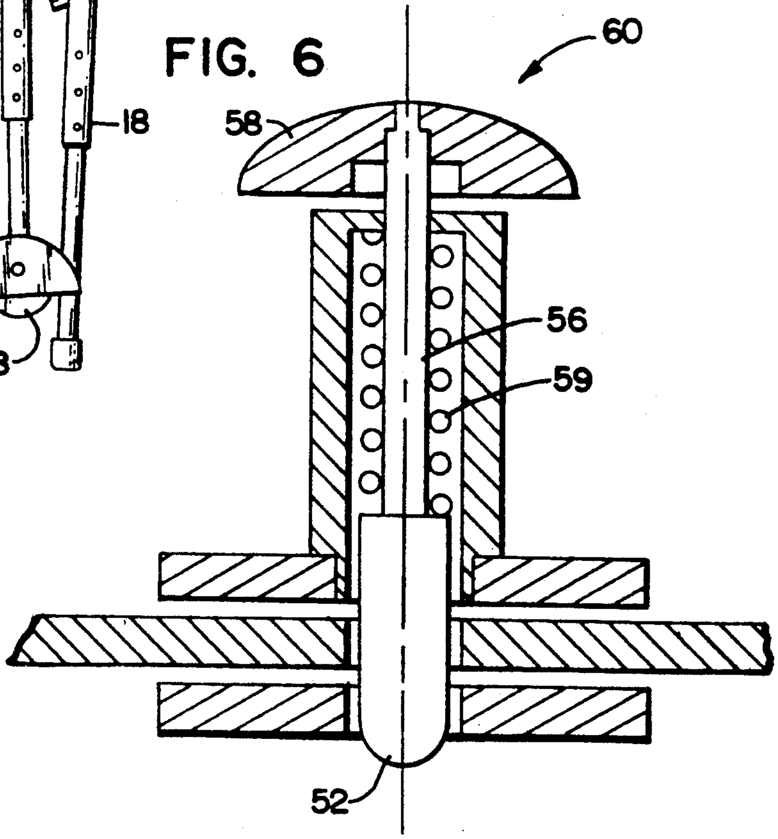
FIG. 6 is a fragmentary cross-sectional view of the engagement device.
Figure 4:
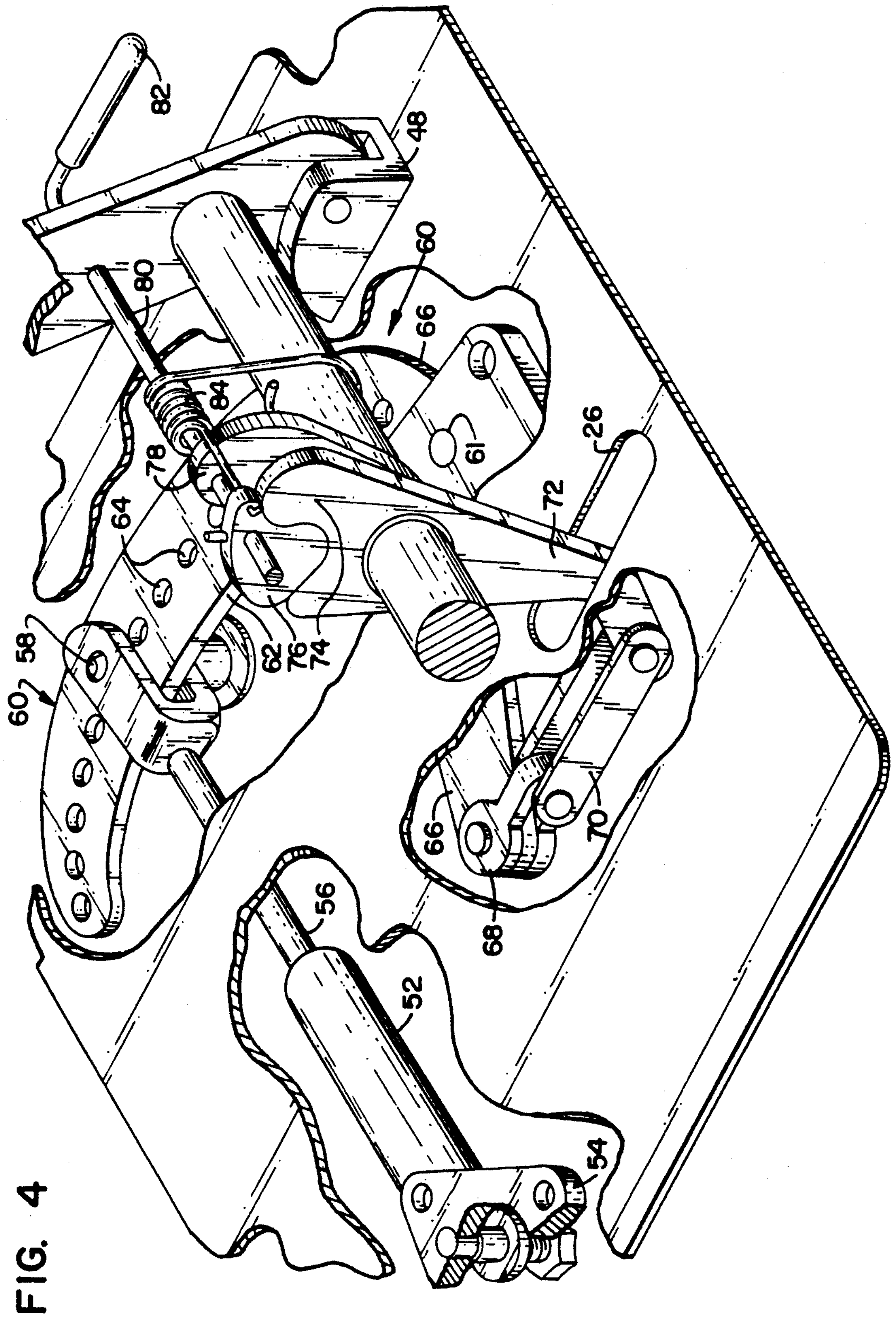
FIG. 4 is a perspective partially broken away view of a portion of the device of FIGS. 1–3, showing a passive energy source and linkage mechanisms used therein.
Figure 5:
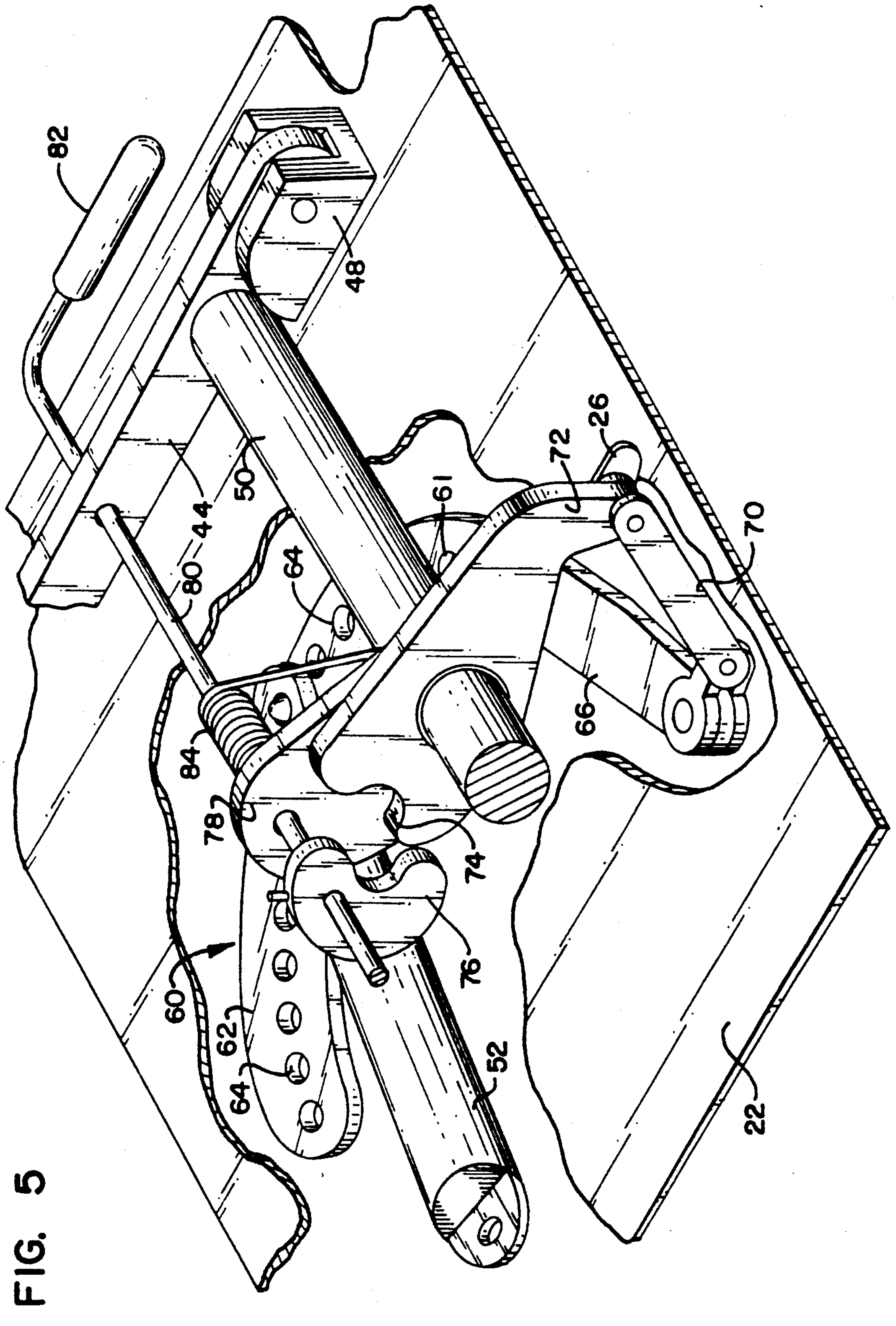
FIG. 5 is another fragmentary perspective view of the passive energy source and linkage mechanism showing further details thereof.
Figure 7:
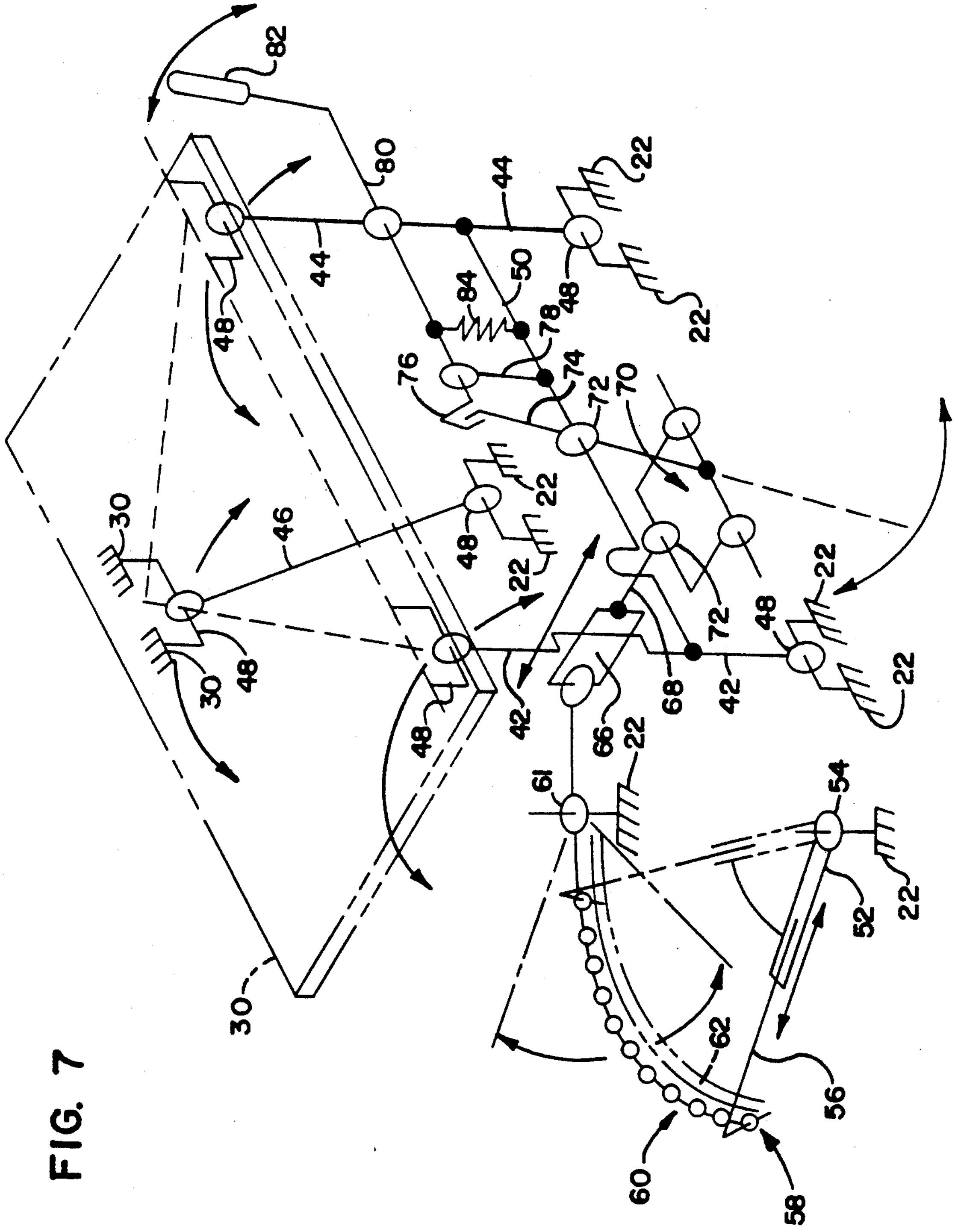
FIG. 7 is a simplified schematic diagram depicting how the gas spring force translates into variable torque on the parallelogram.

A passive energy storage device, and a motion conversion system, are disposed on the underside of the seat base 22, the energy storage device comprising a gas spring 52 of a type supplied by Suspa, Inc., Model No. 952-C16-07953. This unit has a cylindrical body, one end of which is mounted on a pivot mount 54 at a selected location, here at one corner of the seat base 22. An extensible member 56 extending from the cylinder of the gas spring 52 can extend and retract along the axis of the spring 52. Because of its pivoted end, this extension and retraction can be in different radial directions relative to the pivot mount 54. The extensible member includes a terminal engagement pin 58 that can be moved through a short travel against an engagement pin spring 59 (as seen in FIG. 6) so as to be seated in different engagement regions on an associated member. This member comprises a lever 60 of substantial length supported in a lever pivot mount 61 in a part of the seat base 22 separated by a given distance from the pivot mount 54 for the gas spring 52. The lever 60 is a flat member that pivots about the mount 61 to turn in a plane closely spaced from and parallel to the plane of the seat base 22. A first, relatively long and curved lever arm 62 on the lever 60 extends from the pivot 61 along an arc which is an approximate circumference relative to the pivot mount 54 for the gas spring 52. This long arm 62 is shown as curved and tapering, to provide clearance for the engagement pin 58 on the end of the extensible member 56. Engagement holes 64 in the long arm 62 are disposed on a curve about the gas spring pivot mount 54. Thus the engagement pin may be seated in any one of the holes 64, to vary the effective length of the arm against which the gas spring 52 exerts force. A relatively short arm 66 forms a second integral part of the lever 60 and extends at an angle, not necessarily a right angle but a substantial variance, relative to the long arm 62. This configuration of the lever 60 is compact and completely within the outlines of the seat base 22.

The end of this shorter arm 66 is coupled to a triple-linkage mechanism, starting with a short pivot link 68 which is rotatable at the short lever arm 66 about what may be referred to in general terms as a vertical axis (assuming that the seat base 22 is substantially horizontal). The other end of the short pivot link 68 is coupled about a horizontal pivot axis to a double horizontal link 70. The term "horizontal" is used here in merely a general descriptive sense, because the forward or anterior end of the double link 70 may be lowered or raised with respect to the horizontal as motion takes place. The triple linkage is completed by a ratchet link 72 pivotally coupled about a horizontal axis to the forward end of the double link 70 and extending upwardly through the opening 26 in the seat base 22. At its upper end the ratchet link 72 is rotatably joined to the torque bar 50. The upper end of the ratchet link 72 includes a concave detent member 74 into which a rotatable pawl 76 is engageable in mating fashion. The rotatable pawl 76 is disposed between a pair of retainer bars 78 (only one of which is shown) which are fixedly attached to the torque bar 50, one retainer bar 78 on each side of the pawl 76. These units are coupled by a pawl control rod 80 extending sideways on the chair through a front link 42 in the parallelogram, the retainer bars 78, and the pawl 76. A pawl control handle 82 on the end of the pawl control rod 80 is angled so that it can be turned up and down by the user so as to move the pawl 76 in and out of engagement with the detent 74 on the ratchet link 72. A spring 84 about the pawl control rod 80 is secured at its opposite ends to the pawl 76 and the torque bar 50 to bias the pawl 76 toward engagement with the detent 74.

The chair 10 also includes a convertible side arm and handle arrangement (refer to FIGS. 1-3) that cooperates with the rest of the structure to provide other features. The side arms 90 normally extend, when the user is seated, forwardly from the upper frame 14, to which they are pivotally coupled. In this position, the ends of the side arms 90 turn downwardly to form an end grip 92, whereas at the back region of the chair a back extension 94 integral with the side arms 90 rests against the rear surface of the back 16 and upper frame 14, when the side arms 90 are in the lowered position. When the side arms 90 are pivoted up and backwardly, however, the back extension 94 is moved downwardly toward the seat base 22, where it engages a lock 96 on the seat base 22 to engage and hold the side arms 90 in an angled position so they can be used as handles in moving the chair 10.

For purposes of rolling the chair 10, front wheels 98 are disposed on the bottom at the lower ends of the front legs 12, the front wheels 98 being covered by caps 100, having cap edges 102 extending forwardly so as to provide a limit or stop against forward tilting of the chair 10. Locking devices may be used on caster wheels so as to prevent rolling of the unit, in conventional fashion.

Still referring to FIGS. 1-7, it will be appreciated that this mechanism provides a compact, light weight, means of elevating and tilting the cushion 32 and seat 30 without the exercise of external force. The gas spring 52 is the type of device that exerts a substantially constant force along its axis of elongation, regardless of the position of the extensible member 56. Consequently, when the seat 30 is lowered, the motion of the torque bar 50 about the pivot points at the lower ends of the front links 42, 44 turns the torque bar backwardly toward the compacted position, and the ratchet link 72 rotates with the torque bar 50 which itself is prevented from rotating because of the engagement of the pawl 76 in the detent 74. Consequently, the forward end of the double horizontal link 70 moves in the forward direction, bringing with it the second short arm 66 of the lever 60. Because of the pivoting of the lever 60 about the lever pivot mount 61, the long arm 62 moves toward the gas spring 52, compressing the extensible member 56 in the gas spring cylinder 52. The closer the engagement pin 58 is to the pivot point, the shorter the effective length of this arm and therefore the less the movement of compression of the gas spring 52. The constant force exerted by the gas spring 52 thus is distributed over the entire downward movement of the seat 30 which means that the seat is thereby adjusted for receiving a lighter mass, or a lighter weight person. At the opposite end, with the engagement pin 58 disposed in an engagement hole 64 at the furthest extreme from the lever pivot 61, the force exerted can be several times that at the minimum position. Consequently, the chair can be adjusted to receive any one of the great majority of individuals in the population, ranging from very light females to quite heavy males. To accept someone outside these limits, the most convenient expedient is to simply substitute a different gas spring 52 so that the unit covers a different range of forces.

A user is assisted in rising by an action that is the reverse of the lowering operation. No substantial effort is required by the user, when the unit is properly adjusted. Instead, mere leaning forward with feet on the ground is enough to change the balance against the upward force exerted by the gas spring 52. It is not difficult for the average handicapped or infirm person to move forward slightly, and perhaps to exert a small downward pressure on the side arms 90. Once this is done, the lifting force provided by the gas spring 52 pushes the long lever arm 62 away, thus moving the short lever arm 66 away from the front edge of the seat base 22, and drawing the double link 70 backwardly so as to rotate the ratchet link 72 about the torque bar 50, rotating the torque bar and the parallelogram linkage 40 with it so as to carry forward the elevating and tilting motion.

Thus energy stored in lowering the chair is returned on lifting the chair seat 30 and the motion is also particularly adapted to interaction with human responses. The major concern is with upward motion, in that it is not desirable to have an accelerating motion that might catapult the use out of the chair seat. This is accommodated readily by the present mechanism, since the amount of lifting motion with angular change is greatest at the start of the motion, and diminishes as the top of the motion is approached. Consequently, the user is aided in reaching the topmost position but recognizes that the upward motion decreases in rate as the topmost position is approached. The unit is entirely passive and the gas spring 52 has a virtually indefinite life, and can be replaced economically in the unlikely event of wear or damage.

The pawl control handle 82 is turned to disengage the linkage mechanism 40 from the gas spring 52 for either one of two major purposes. If it is desired, for example, to readjust the position of the engagement pin 58 relative to the long lever arm 62, the pawl control handle 82 is turned, disengaging the pawl 76 from the detent 74. This frees the torque bar 50 to rotate within the front links 42, 44 so that the triple linkage mechanism can rotate with the torque bar, folding into position, and the engagement pin 58 can then be freed from the engagement hole 64 in which it is located so that the gas spring 52 can be turned to a different angular position and a different engagement hole can be occupied. Turning of the control handle 82 also is useful as a safety device, in the event of concern about inadvertent shifting of the weight of a user seated on the chair 10.

With the arrangement of FIGS. 1-7, it is not necessary for someone to carry the chair to move to a different location. To move the chair 10, the side arms 90 are simply rotated backwardly, with the back extension 94 moving down against the seat base 22, locking the back extension into the lock 96 on the seat base. With front wheels 98 as shown, the chair is simply pushed by the end grips 92, now used as control handles, from one room or location to another. It should be noted that rear wheels may also be used, in which event the person controlling the chair 10 need not even have sufficient strength to tilt the chair slightly forward. When tilting the chair 10 forward, the cap edges 102 at the forward surfaces prevent tilting too far in the forward direction, thus protecting the safety of the user. This is a safety feature so that when the user pushes down on the arms when getting up, the chair will not flip over with the rolling wheels as a moving pivot.

Figure 8:
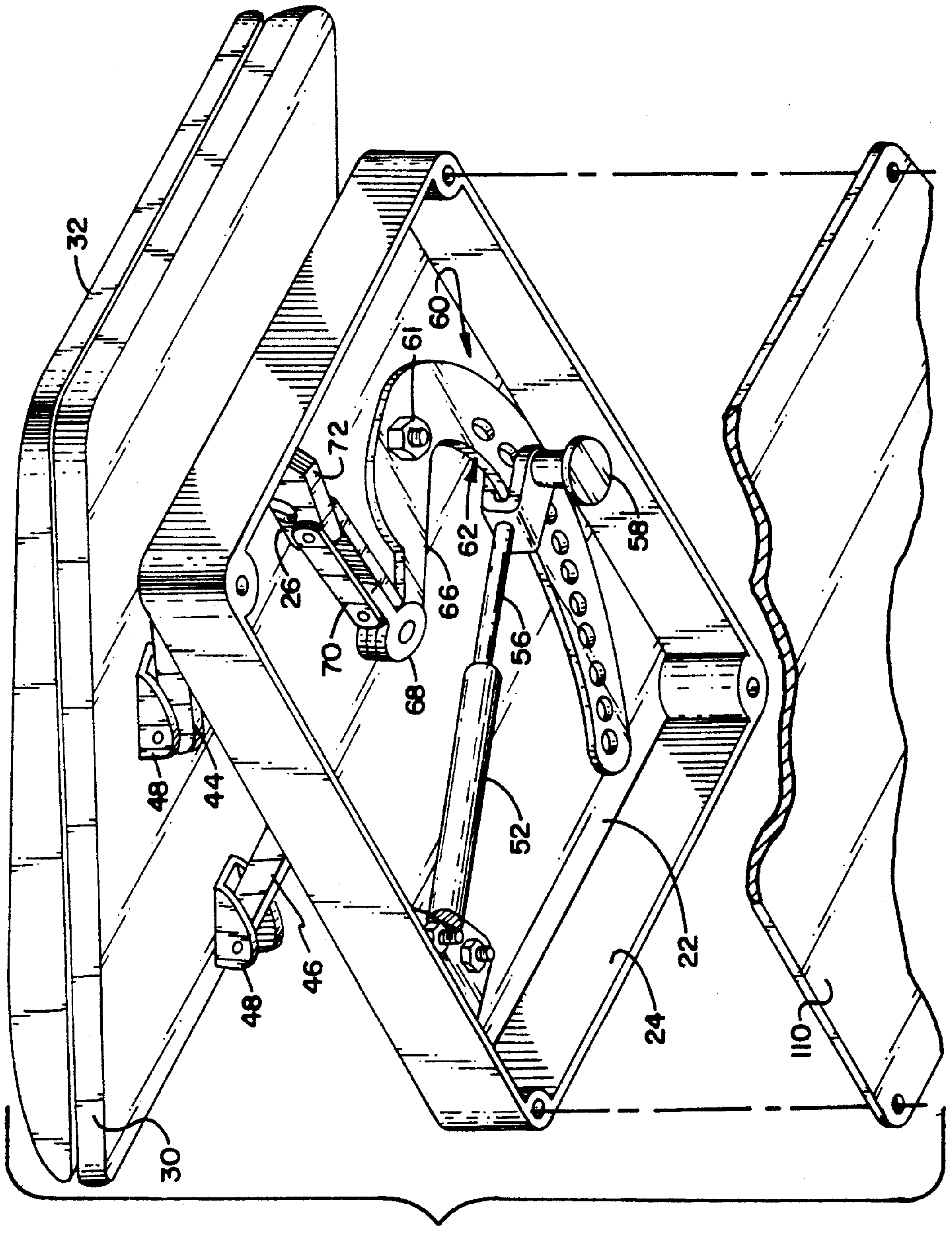
FIG. 8 is a perspective and exploded view of a self contained seating unit from the front lower side, showing the seating device in an up position.
Figure 9:
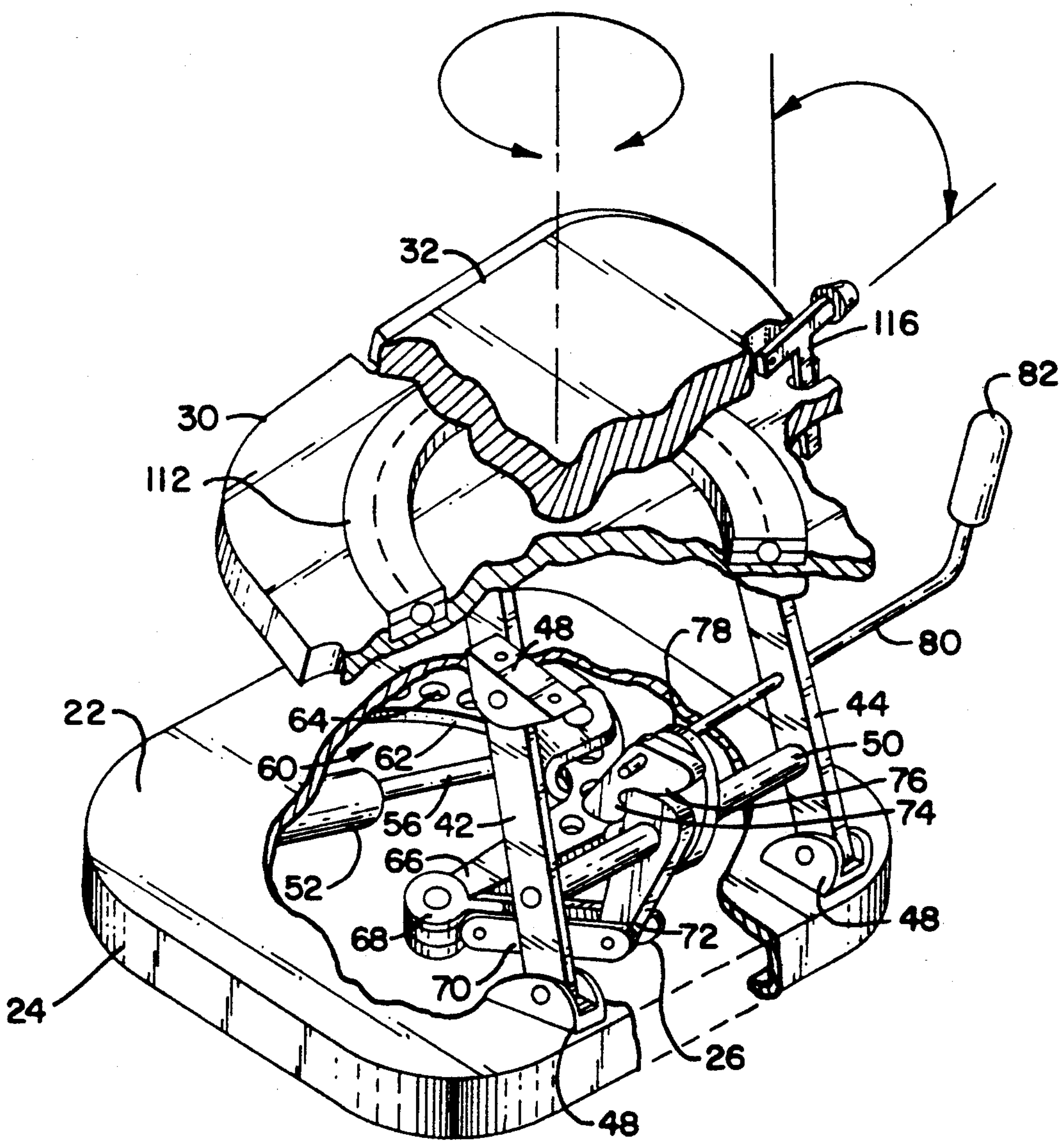
FIG. 9 is a perspective view, partially broken away, of the arrangement of FIG. 8, showing the chair seat on a turntable to enable a user to shift position.

This compact efficient arrangement provides a useful seat elevating and tilting mechanism, independently of the chair or seating arrangement with which it is used. FIGS. 8 and 9 depict such a system, numbers corresponding to FIGS. 1-7 being used except where differences are to be noted. In this example, the underside of the seat base 22 is covered, about the periphery of the sidewall 24 with a bottom plate 110, so that the unit can be placed on any suitable surface, whether bench chair, car seat, or other substantially horizontal surface. The seat 30 in this example is not simply covered with a cushion but supports an intermediate turntable 112 (FIG. 9) that can be rotated about a plane parallel to the seat 30. The cushion 32 on top of the turntable 112 is secured in position, so as to move with the turntable 112. This securement need not be permanent but may comprise a removable but secure type of structure, such as a Velcro coupling (not shown). It is preferred with this arrangement to use a side lock, such as a simple pin coupling 116 (FIG. 9 only) engageable in aligned holes in the turntable 112 and the seat 30, so as to enable the cushion to be turned 90° from a normal position, in either direction. The normal position is that in which the elevating and tilting motion is most convenient for the user. For example, if the unit of FIGS. 8 and 9 is placed in a car seat, it will be placed in the normal position to receive the passenger from the side door. When lowered into substantially horizontal position, the turntable 112 lock is released, the user is rotated on the turntable 112 to a position facing directly ahead in the vehicle, and the lock is replaced in position for normal driving, for which purpose a seat belt can be readily attached over the user.

When arriving at a destination, therefore, the door of the vehicle is opened, the lock on the turntable 112 is released and the cushion 32, turntable 112 and user are rotated 90° to face the side door, and the user is simply leaned forward to aid in the evacuation motion. This provides a unique solution to a difficult problem with aged and infirm individuals, for whom getting in and out of a vehicle is often an extremely difficult task.

Figure 10:
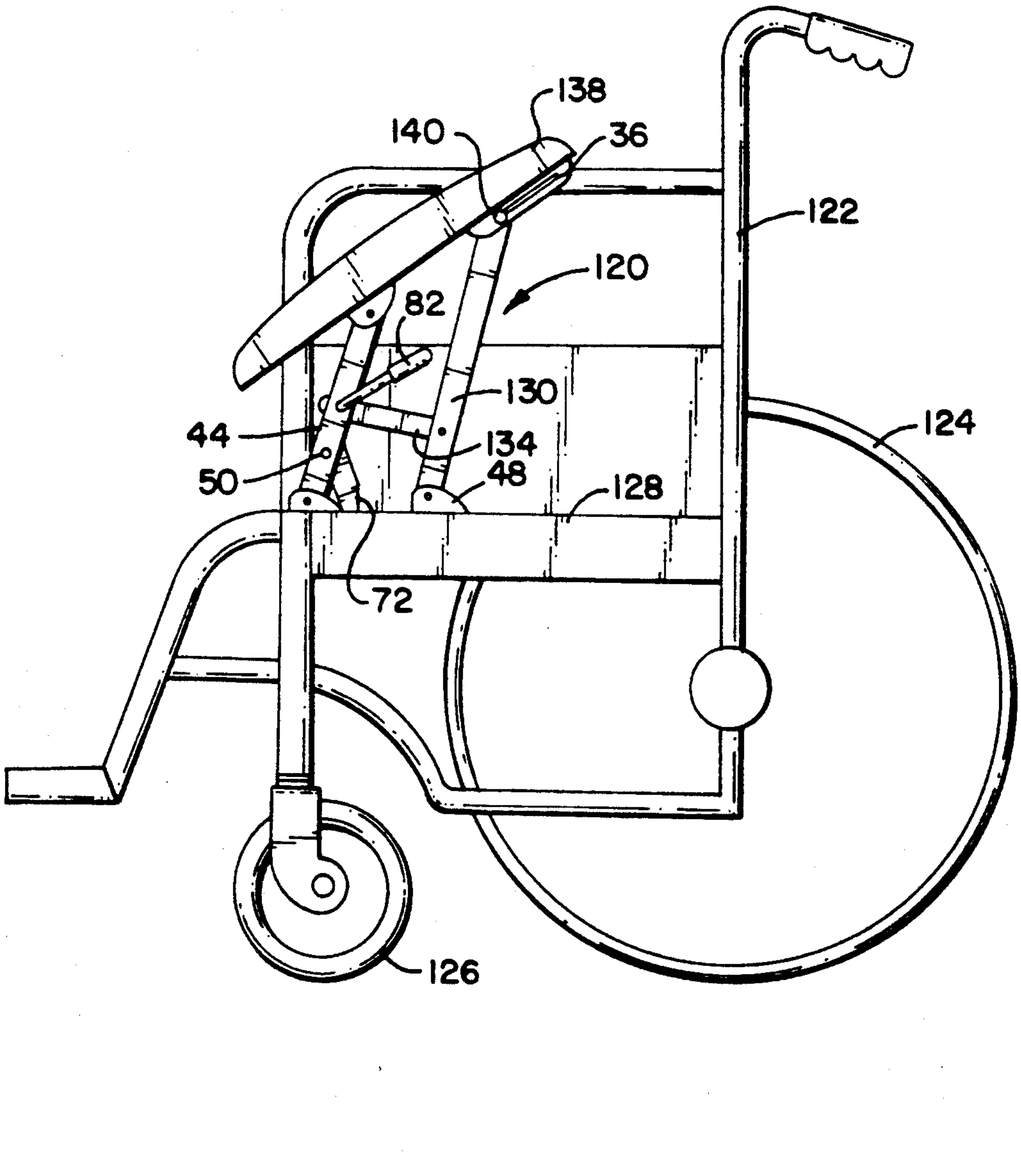
FIG. 10 is a side sectional view of a wheelchair using an elevating and tilting seat structure having increased adjustable tilt in accordance with the invention.
Figure 11:
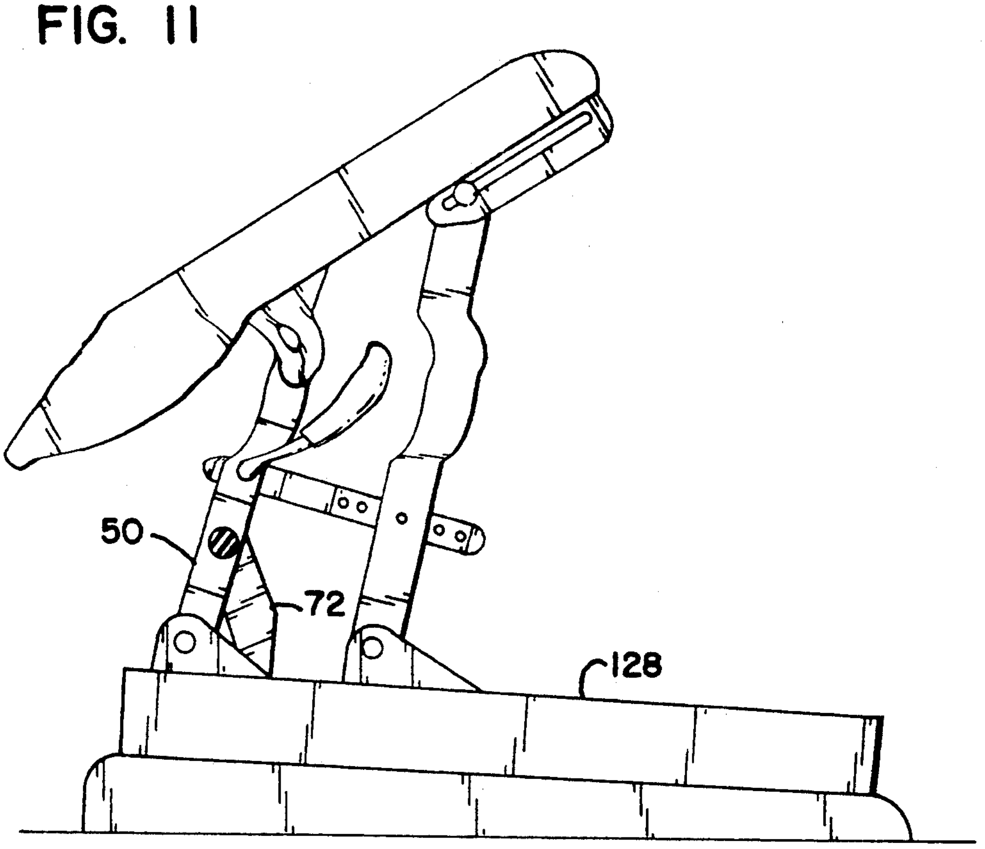
FIG. 11 is a side view of the extra variable tilt version of the seating device.

The wheelchair version of FIGS. 10 and 11 is shown as viewed in a side section view with the left side arm, side, and wheels removed, so that a modified, extra lift seating unit 120 may be seen more clearly. The wheelchair frame 122, major wheels 124 and castered front wheels 126 are spaced to receive a seat base 128 beneath which the passive energy storage device is disposed. The ratchet link 72 extends up through an opening 26 in the seat base 128 to engage a torque bar 50 between front links 42, 44 as previously described. In this version, however, the front links 42, 44 are coupled to two back links, only the left one 130 of which is visible. A coupling link 134 joins each front link 42 or 44 to the aligned rear link, e.g. 130. The front and back link pairs are not, however, held in parallelism, because a slotted mount 136 on the underside of the seat 138 receives a follower pin 140 in the upper end of the link 130.

Consequently, as the elevate and tilt mechanism rises up from the horizontal position on the seat base 128, the linkage functions as a variable parallelogram. The coupling link 134 draws the back link 130 toward the front of the slotted mount 136, increasing the angle of tilt until the limit is reached. The same mechanism may be used as a separate device, placeable on any surface 142, as seen in FIG. 11.

Figure 12:
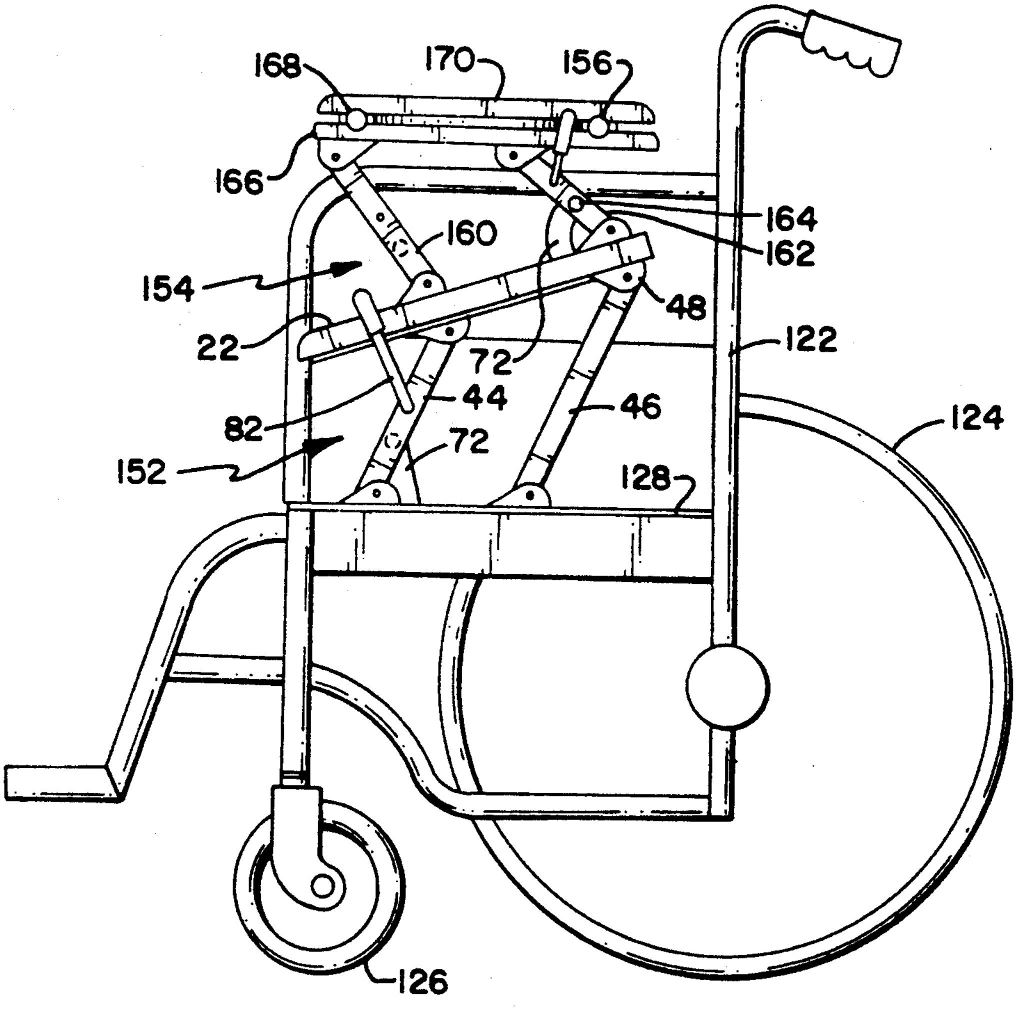
FIG. 12 is a side sectional view of a double lift unit with two compensating parallelograms and two gas springs.

The double lift mechanism 150 of FIG. 12 is also depicted as mounted on a wheelchair frame 122, and the view is a side sectional taken with the left side removed, as before. Here, however, two elevate and tilt mechanisms 152, 154 are used in series relationship to illustrate how a user may be raised substantially if needed, as for transfer to another surface. The lower unit 152 is as previously described, with shorter front links 42, 44 and a longer back, leg 46 providing a downward frontal tilt when raised. The control handle 82 enables this mechanism to be decoupled if desired.

Similarly, the upper mechanism 154 may also be decoupled by its own control handle 156 if desired, so that either one of the units, or both, can be operated. It will be appreciated that the passive energy storage units and force translation devices are disposed under the lower seat 128 and under the seat 22, as previously described in conjunction with other Figures. In the upper mechanism 154 the front legs 160 are longer than the back link 162, and the ratchet link 72 engages the torque bar 164, which is seated in the back link 162. The top base 166 a supports a turntable 168 on which a seat cushion 170 is disposed. Thus, when both mechanisms 152, 154 are engaged, a user can be raised, even above the level of the wheelchair side arms, and rotated on the turntable 168 for transfer to a bed or other surface. The double lift arrangement is obviously usable in stand alone form in a variety of other applications.

While a number of forms and modifications in accordance with the invention have been described, it will be appreciated that the invention is not limited thereto but encompasses all variants and alternatives within the scope of the appended claims.

What is claimed is:

1. A device for enabling a person to be raised and lowered by a seat member comprising:

a planar base member disposed substantially parallel to and below the seat member when it is in a lowered position;

a multi-arm linkage mechanism coupling the upper surface of the base member to the undersurface of the seat member, the arms of the linkage mechanism including pivotal coupling means at each end;

force storage means comprising gas spring means including an extensible member, the gas spring means and extensible member being laterally disposed adjacent and substantially parallel to the underside of the base member, arcuate lever means pivotally coupled to the base member on the underside thereof, the pivotal coupling being in a region intermediate the length of the arcuate lever means, and the lever means including a number of engagement means spaced therealong;

adjustable coupling means coupling the extensible member of the force storage means to the lever means at one of the selected engagement means thereon; and linkage means partially disposed in a plane substantially normal to the base member plane and coupling an end of the arcuate lever means to the linkage mechanism for transferring forces from the force storage means to the seat member as the seat member position changes.

2. A device as set forth in claim 1 above, wherein the arcuate lever means comprises a pair of arms extending from the intermediate pivot, a first of the arms including the engagement means thereon, and the second of the arms being coupled to the linkage means.

3. The invention as set forth in claim 2 above, wherein the linkage means is coupled to the second end of the lever means and includes first link means movable in a plane parallel to the base member, and further link means coupling the first link means to the linkage mechanism for exerting a force on the linkage mechanism during both rising and lowering movement.

4. The invention as set forth in claim 3 above, wherein the linkage mechanism further comprises a transverse bar extending between arms thereof, and the further link means comprises a pair of selectively engageable members, such that when disengaged the linkage mechanism is decoupled from the gas spring means.

5. The invention as set forth in claim 4 above, wherein the further link means comprises a ratchet link means extending in the normal plane from the first link means and rotatably coupled to the transverse bar, and a latching mechanism comprises pawl means engageable with the ratchet link means to lock the ratchet link means to the transverse bar.

6. The invention as set forth in claim 5 above, including spring means coupling the pawl means to the transverse bar for biasing the pawl means toward engagement with the ratchet link means, the spring means being coupled to an externally accessible control handle means parallel to the transverse bar, for disengaging the pawl means from the ratchet means.

7. The invention as set forth in claim 6 above, wherein the device includes angled front and rear legs, the front legs extending to a backseat part, and pivot link means intercoupling the front and back legs and coupled to the base member to provide a folding chair arrangement.

8. The invention as set forth in claim 7 above, wherein the folding chair includes arm means extending about the front legs and including a backward angled extension engaging the back of the backseat when the arm means are in a substantially lowered position, such that the arm means can be pivoted relative to the front legs until the angled extension engages the base member and the arm means are disposed behind the seat back to provide control for the chair.

9. The invention as set forth in claim 8 above, wherein at least the front legs of the chair include wheel means and the back of the chair includes latch means mounted to engage the backward extension of the arm means when the arms are pivoted up, such that the chair may be rolled on the wheel means when tilted forward.

10. The invention as set forth in claim 9 above, wherein the front wheel means include covers configured with forward edges limiting forward tilting movement of the chair about the forward wheels.

11. The device as set forth in claim 1 above, wherein the multi-arm linkage mechanism includes front and rear arms, wherein the pivotal coupling means at the rear arms include slidable supports at the end adjacent the seat member, and wherein cross links couple the front and rear arms, such that the seat member can be tilted to a greater angle.

12. The invention as set forth in claim 1 above, wherein the device is a self-contained unit, including a bottom cover attached to the base member such that the device may be placed on different support surfaces.

13. The invention as set forth in claim 1 above, further including turntable means supporting the seat member and supported on the linkage mechanism, such that the user and the seat member can rotate while the base member is in a fixed position, and including lock means for preventing rotation of the seat member.

14. A first device as set forth in claim 1 above, further comprising a second substantially like device having its planar base member mounted in place of the seat member of the first device on the linkage mechanism of the first device, such that the displacement of the seat of the second device relative to the base plate of the first device substantially doubles.

15. The invention as set forth in claim 14 above, wherein the first device includes arms in the multi-arm linkage which provide a forward tilt when elevated, and wherein the second device includes arms in the multi-arm linkage mechanism which provides a compensating tilt when elevated, and wherein each device includes means for separately disengaging the linkage means.

16. In a lift seat structure employing a planar base and an intermediate linkage for raising and lowering a seat relative to the base, the combination comprising:

an elongated spring member disposed adjacent and along one side of the base, the spring member being pivotally coupled to the base and having an extensible element extending therefrom;

lever means comprising first and second arms extending from an intermediate pivot region to free ends, the first arm being disposed substantially transversely to the extensible element and including a number of engagement regions at different distances from the intermediate pivot region, the second arm extending from the pivot region in a different direction than the first arm, and both the first and second arms lying in a plane adjacent and parallel to the base;

pivot means coupling the lever means to the base in the pivot region;

means detachably coupled a free end of the extensible element to one of the engagement regions of the first arm; and linkage means pivotally coupled to the free end of the second arm and to the intermediate linkage mechanism.

17. The invention as set forth in claim 16 above, wherein the spring member is held under compression and provides an outward force along the extensible member toward the first arm of the lever means, and wherein the engagement regions on the first arm are disposed along a circumference at a given approximate radius relative to the intermediate pivot region.

18. The invention as set forth in claim 17 above, wherein the spring member comprises a gas spring member having a cylindrical body pivoted at one end on the base, and the extensible member extending therefrom, the spring member and the lever means being disposed on a side of the base opposite from the seat.

19. The combination as set forth in claim 16 above, wherein the linkage means comprises means for detachably latching to the intermediate linkage mechanism, to transfer, when latched, forces exerted by the spring member to the intermediate linkage mechanism.

20. The invention as set forth in claim 19 above, wherein the linkage means further comprises a series of pivotally coupled links extending along a plane substantially normal relative to the plane of the base, wherein the intermediate linkage mechanism includes a member rotatable therein, and wherein the linkage means comprises means for latching the link coupled to the rotatable member so as to restrict the linkage means against folding so as to transfer forces during raising and lowering between the spring member and the intermediate linkage mechanism.

21. A low profile seating device including a lifting seat and means for aiding a person to sit upon and rise from the seat, comprising:

planar base means disposed in a normally horizontal position;

energy storage means disposed below the base means and including lever means coupled to the energy storage means and movable to compress and storage energy in the energy storage means when the seat is to be lowered and to provide energy to lift the seat when it is to be raised, the lever means moving in a substantially horizontal plane;

seat means including mechanical linkage means for providing a controlled seat elevating motion;

linkage means coupled through the base from the lever means to the seat means, such that lowering the seat compresses the spring means to provide energy for raising the seat means thereafter, and the linkage means is confined between the base means and seat means.

22. The invention as set forth in claim 21 above, wherein the seat means includes a cushion support panel, and means coupling the seat means to the cushion support panel and a cushion on the cushion support panel, such that the cushion and cushion support panel can be rotated relative to the seat means to permit a user to rotate.

23. A mechanism for passively providing force to aid an aged, infirm or handicapped person in sitting down on and rising from a seat, in a sitting device of the type having a parallelogram linkage coupling a seat base to the seat, comprising:

a parallelogram linkage including crossbar means, disposed in a plane spanning the seat width, for controlling seat motion and altitude relative to the base;

compression spring means having a first end pivotally coupled in a parallel plane to the base and an extendable second end;

lever means, pivotally coupled in a parallel plane to the base having a first arm and a second arm extending in substantially perpendicular directions and the first arm providing a number of engagement points for coupling to the second end of the spring means;

linkage means comprising a number of pivotally coupled links for coupling the second arm of the lever means to the crossbar means so that forces exerted by said spring means are transferred to the parallelogram linkage, said linkage means including means for disengaging from the crossbar means.

24. The invention as set forth in claim 23 above, wherein the engagement points on the lever means are disposed at varying radii from a pivot point thereon and wherein the spring is a gas spring of the type providing substantially constant force throughout its stroke, such that a change in the engagement point changes the torque on the first arm of the lever means and consequently the second arm of the lever means even though the forces exerted are substantially constant throughout the length of travel of the seat.

25. The invention as set forth in claim 24 above, wherein said lever means pivots in a plane substantially normal to the direction of elevation of the seat and the linkage means is disposed in a plane substantially parallel to the direction of elevation of the seat, and the linkage means comprises a first transfer arm, pivotally coupled to rotate at the end of the second arm of the lever means in the same plane therewith, an intermediate arm coupled to the end of the transfer arm at the end opposite the coupling to the lever means, and ratchet arm means pivotally coupled to the intermediate arm and coupled to the crossbar means, and pawl means coupled to the multi-arm linkage means and engageable to the ratchet means adjacent to the crossbar means to prevent rotation of the crossbar means relative to the multi-arm linkage.

26. The invention as set forth in claim 25 above, wherein the intermediate arm of the linkage means comprises double arms and the ratchet means comprises a single means disposed between the double arms, the ratchet means having a detent therein disposed above the crossbar means, and wherein the pawl means comprises a control shaft having a terminal handle disposed at the side of the seat, the shaft extending through at least one arm of the multi-arm linkage and including means coupled to the crossbar means on opposite sides of the linkage means, and a pawl member rotatably engageable into the detent of the ratchet arm means, and spring means for normally rotating the ratchet arm means into position against the detent.

* * * * *

UNITED STATES PATENT AND TRADEMARK OFFICE

CERTIFICATE OF CORRECTION

PATENT NO. : 5,178,025

DATED : January 12, 1993

INVENTOR(S) : John E. Bennett and Leonard Katzin

It is certified that error appears in the above-identified patent and that said Letters Patent is hereby corrected as shown below:

Column 10, Claim 16, line 47, "coupled" should read --coupling--.

Column 11, claim 21, line 21 and 22, "storage" should read --store--.

Signed and Sealed this

Sixteenth Day of November, 1993

Attest:

Bruce Lehman

BRUCE LEHMAN

Attesting Officer

*Commissioner of Patents and Trademarks*